United States Patent
Chapman (10) Patent No.: US 7,394,830 B2
(45) Date of Patent: *Jul. 1, 2008

(54) SYSTEM FOR SYNCHRONIZING CIRCUITRY IN AN ACCESS NETWORK

(75) Inventor: John T. Chapman, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 786 days.

This patent is subject to a terminal disclaimer.

(21) Appl. No.: 10/662,025

(22) Filed: Sep. 11, 2003

(65) Prior Publication Data

US 2005/0058159 A1 Mar. 17, 2005

(51) Int. Cl.
*H04J 3/06* (2006.01)
*G04F 1/04* (2006.01)

(52) U.S. Cl. .............. 370/503; 370/324; 370/509; 713/400; 713/503; 713/600; 375/354

(58) Field of Classification Search .......... 370/324, 370/503; 375/354; 713/400, 503, 600
See application file for complete search history.

(56) References Cited

U.S. PATENT DOCUMENTS

| | | | | |
|---|---|---|---|---|
| 6,137,793 | A | 10/2000 | Gorman et al. ............. | 370/360 |
| 6,556,591 | B2 * | 4/2003 | Bernath et al. ............. | 370/516 |
| 6,791,995 | B1 * | 9/2004 | Azenkot et al. ............. | 370/436 |
| 6,807,195 | B1 * | 10/2004 | Moore et al. ............. | 370/503 |
| 6,873,195 | B2 * | 3/2005 | Dormitzer et al. ........... | 327/163 |
| 6,965,616 | B1 * | 11/2005 | Quigley et al. ............. | 370/480 |
| 7,139,923 | B1 * | 11/2006 | Chapman et al. ............ | 713/400 |
| 7,206,327 | B2 * | 4/2007 | Lorek et al. ................. | 370/503 |
| 2001/0043622 | A1 * | 11/2001 | Bernath et al. ............. | 370/516 |
| 2002/0088003 | A1 | 7/2002 | Salee ........................ | 725/111 |
| 2003/0058893 | A1 * | 3/2003 | Dworkin et al. ............. | 370/503 |

FOREIGN PATENT DOCUMENTS

WO WO 01/17167 A2 3/2001
WO WO 03/028374 A1 4/2003

OTHER PUBLICATIONS

Cable Television Laboratories, Inc., "DOCSIS Set-top Gateway (DSG) Interface Specification", 2001, pp. 1-19.

* cited by examiner

Primary Examiner—Edan Orgad
Assistant Examiner—Venkatesh Haliyur
(74) Attorney, Agent, or Firm—Stolowitz Ford Cowger (57) ABSTRACT

A master Timestamp Synchronization Circuit (TSC) in a Cable Modem Termination System (CMTS) estimates a master timestamp value for an upcoming time reference. The master TSC sends the master timestamp value asynchronously over an Internet Protocol (IP) network to slave TSCs in other CMTSs. The slave TSC compares a local timestamp value with the master timestamp value when the upcoming time reference occurs. If the local timestamp value does not match the master timestamp value, the slave TSC is resynchronized using the master timestamp value.

16 Claims, 6 Drawing Sheets

SYSTEM FOR SYNCHRONIZING CIRCUITRY IN AN ACCESS NETWORK

BACKGROUND

This invention relates to digital computer network technology. More specifically, it relates to methods and apparatus for synchronizing components within the Head End of an access network.

In conventional Data Over Cable Service Interface Specification (DOCSIS) systems, there may be multiple Cable Modem Termination Systems (CMTSs) each including a plurality of physically distinct line cards having appropriate hardware for communicating with cable modems in the network. Each CMTS and each line card is typically assigned to a separate DOCSIS domain, which is a collection of downstream and upstream channels.

Typically, each DOCSIS domain includes a single downstream channel and one or more upstream channels. The downstream channel is used by the CMTS to broadcast data to all cable modems (CMs) within that particular domain. Only the CMTS transmits data on the downstream. In order to allow the cable modems of a particular DOCSIS domain to transmit data to the CMTS, the cable modems share one or more upstream channels within that domain.

Access to the upstream channel is controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context is tracked using a counter, commonly referred to as a timestamp counter, which, according to conventional implementations is a 32-bit counter that increments by one every clock pulse.

In conventional configurations, each line card in each CMTS may have its own unique timestamp counter which generates its own local time reference. Thus, each line card in the DOCSIS system operates according to its own local time reference, and is not synchronized with other line cards in the same CMTS or with line cards in other CMTSs.

Each line card in the DOCSIS system periodically distributes a timestamp value of its local time reference to the respective group of cable modems serviced by that line card. For this reason, a first group of cable modems serviced by a first line card in a first CMTS will not be synchronized with a second group of cable modems serviced by a second line card in a second CMTS.

The present invention addresses this and other problems associated with the prior art.

DETAILED DESCRIPTION

One technique for synchronizing different line cards in a DOCSIS system is described in copending application Ser. No. 09/490,761 filed Jan. 24, 2000, entitled: Technique for Synchronizing Multiple Access Controllers at the Head End of An Access Network, which is herein incorporated by reference. The synchronization scheme described below can be used in combination with the synchronizing scheme described this copending application.

A synchronization system synchronizes different CMTSs in different chassis. The synchronization system can also be used to retrofit previous generation CMTSs to achieve internal synchronization between DOCSIS domains within the same chassis.

Figure 1:
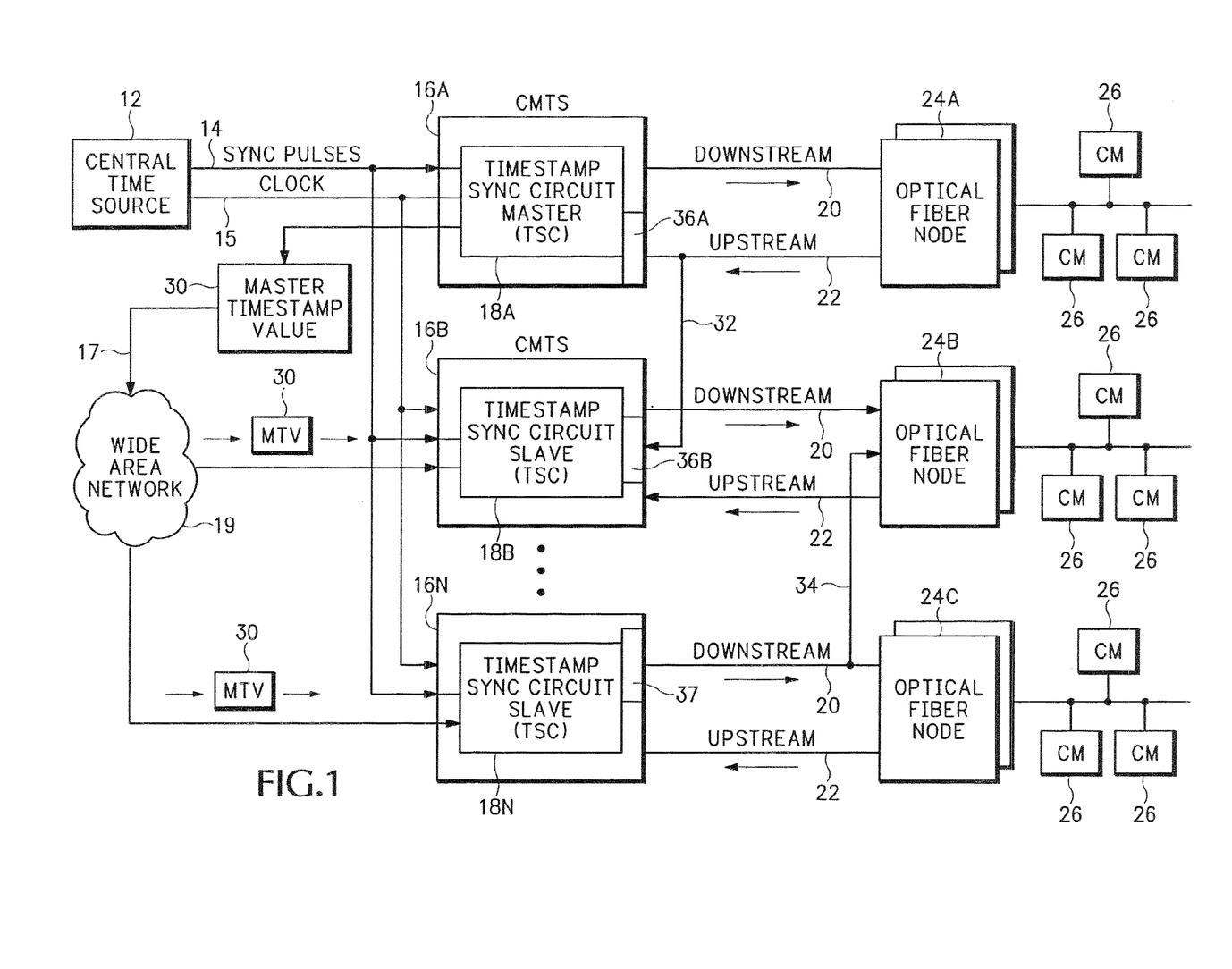
FIG. 1 is a block diagram of a synchronization system used for an access network.

FIG. 1 shows a DOCSIS system that includes multiple CMTSs 16A-16N that are each connected with an associated optical fiber node 24. Each fiber node 24 is coupled to multiple cable modems 26 that receive IP data over downstream path 20 and transmit IP data over upstream path 22. The CMTS 16A includes a master Timestamp Synchronization Circuit (TSC) 18A and the other CMTSs 16B-16N include slave timestamp synchronization circuits 18B-18N, respectively. In one embodiment, each CMTS 16 is located in a separate chassis. However, other embodiments may have one or more of the CMTSs 16 located in the same chassis.

A central time source 12 generates synchronization pulses 14 and a clock signal 15 to the CMTSs 16A-16N. In one embodiment, the central time source 12 may be located in one of the CMTSs. In another embodiment, the central time source 12 may be a standalone circuit not contained in one of the CMTSs. In one embodiment, each CMTS includes one or more coaxial cable connectors (not shown) that is used to receive the synchronization pulses 14 and the clock signal 15.

Through a software protocol, the master TSC 18A asynchronously sends out a message 30 to all the slave TSCs 18B-18N containing a master timestamp value. In one example, the message 30 comprises Internet Protocol (IP) packets sent over a Wide Area Network (WAN) 19. A connection 17 is established by any interface on the CMTS 16A that is capable of sending IP packets over WAN 19. One or more messages 30 contain the IP destination addresses for all CMTSs 16B-16N that need to be synchronized with CMTS 16A. In an alternative embodiment, one message 30 is sent by master TSC 18A that contains a multicast address associated with CMTSs 16B-16N.

In one example, 1 Hertz sync pulses 14 (one pulse per second) or some other low frequency is generated by the central time source 12 and distributed to each CMTS 16. Any frequency for sync pulses 14 can be used that has a long enough period to allow the IP message 30 to be received and processed before the next sync pulse to all slave TSCs 18B-18N. The master timestamp value message 30 is set asynchronously. A local timestamp counter (FIG. 2) in each slave TSC should match the master timestamp value at the occurrance of a next one of the synchronization pulses 14. Any local timestamp value that does not match the master timestamp value is resynchronized with the master timestamp value.

This synchronization scheme allows line cards in different CMTSs to be synchronized. Downstream line cards can be located in separate chassis from upstream line cards. One CMTS can have multiple downstream groups and another CMTS can have multiple upstream groups. For example, an upstream line card 36B in CMTS 16B can process data normally only capable of being processed by an upstream line card 36A in CMTS 16A. Further, a downstream line card 36 in CMTS 16N can send data to cable modems on fiber node 24B that normally could only receive data from CMTS 16B.

This provides a synchronization solution for line cards that are not connected together over a common backplane and can not send timing information synchronously between different line cards. This provides more efficient redundancy configurations and allows existing CMTSs to be retrofitted for synchronization in a less backplane pin intensive manner.

In the example shown in FIG. 1, the master TSC circuit 18A is located in CMTS 16A. However, the master TSC 18A could alternatively be located in the central time source 12. In this configuration, the central time source 12 has a processor and interface for sending master timestamp values over wide area network 19 and the CMTS 16A has a slave TSC.

Any delay differences from the generation of the sync pulses 14 at the central time source 12 to the arrival at any of the timestamp synchronization circuits 18 will be engineered to be a relative fixed value for all TSCs 18. This could be done by adjusting the master timestamp value according to the difference in delay. Different CMTSs 16 can also allocate portions of that delay between different resources. For example, some CMTSs may have a timestamp bus that would create more delay in the TSC. In other CMTSs, the TSC may receive the sync pulses 14 directly and may not have to add as much or any delay. The TSCs can adjust the received master timestamp value according to these delays.

Figure 2:
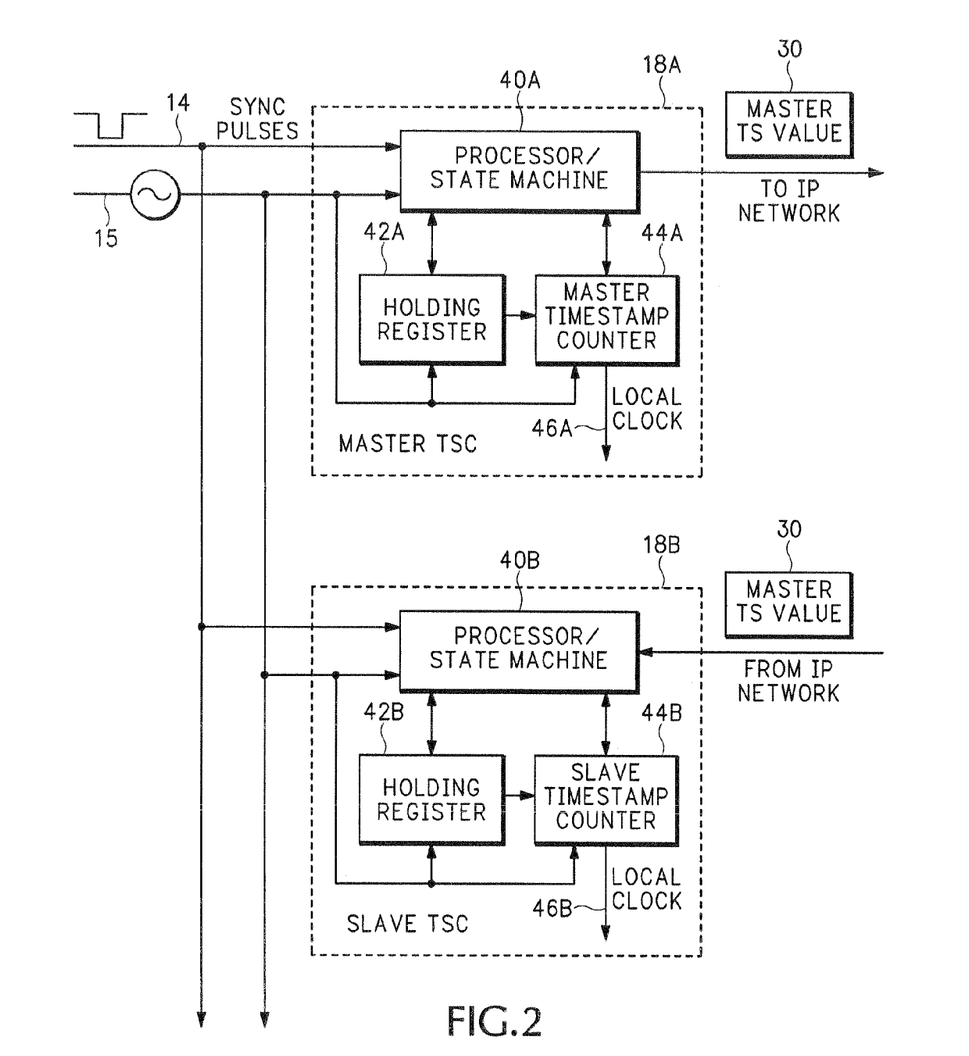
FIG. 2 is a block diagram showing individual Timestamp Synchronization Circuits (TSCs) in the access network.

FIG. 2 shows in more detail the circuitry inside the master TSC 18A and the slave TSC 18B. Each CMTS includes a TSC 18 having a processor or state machine 40 that receives the synchronization pulses 14. The processor or state machine 40 may be the same central processing unit used in the CMTS for processing data or can be a separate circuit just for processing timing signals. The master TSC 18A generates the master timestamp value and sends it in message 30 over the WAN 19 (FIG. 1) or some other portion of an IP network. The slave synchronization circuit 18B receives the master timestamp value 30 from the IP network.

Holding registers 42 store the received master timestamp value for comparing with the value generated by the timestamp counters 44 at the next one of the received sync pulses 14. The timestamp counters 44 are used for counting an amount of time between synchronization pulses 14 and generating a local clock 46. The slave TSC 18B at the next received synchronization pulse 14 compares the master timestamp value stored in holding register 42B with the local timestamp value generated by slave timestamp counter 44B. If the two values match, the slave timestamp counter 44B continues as normal. If the two values do not match, the master timestamp value stored in holding register 42B is loaded into the slave timestamp counter 44B.

Figure 3:
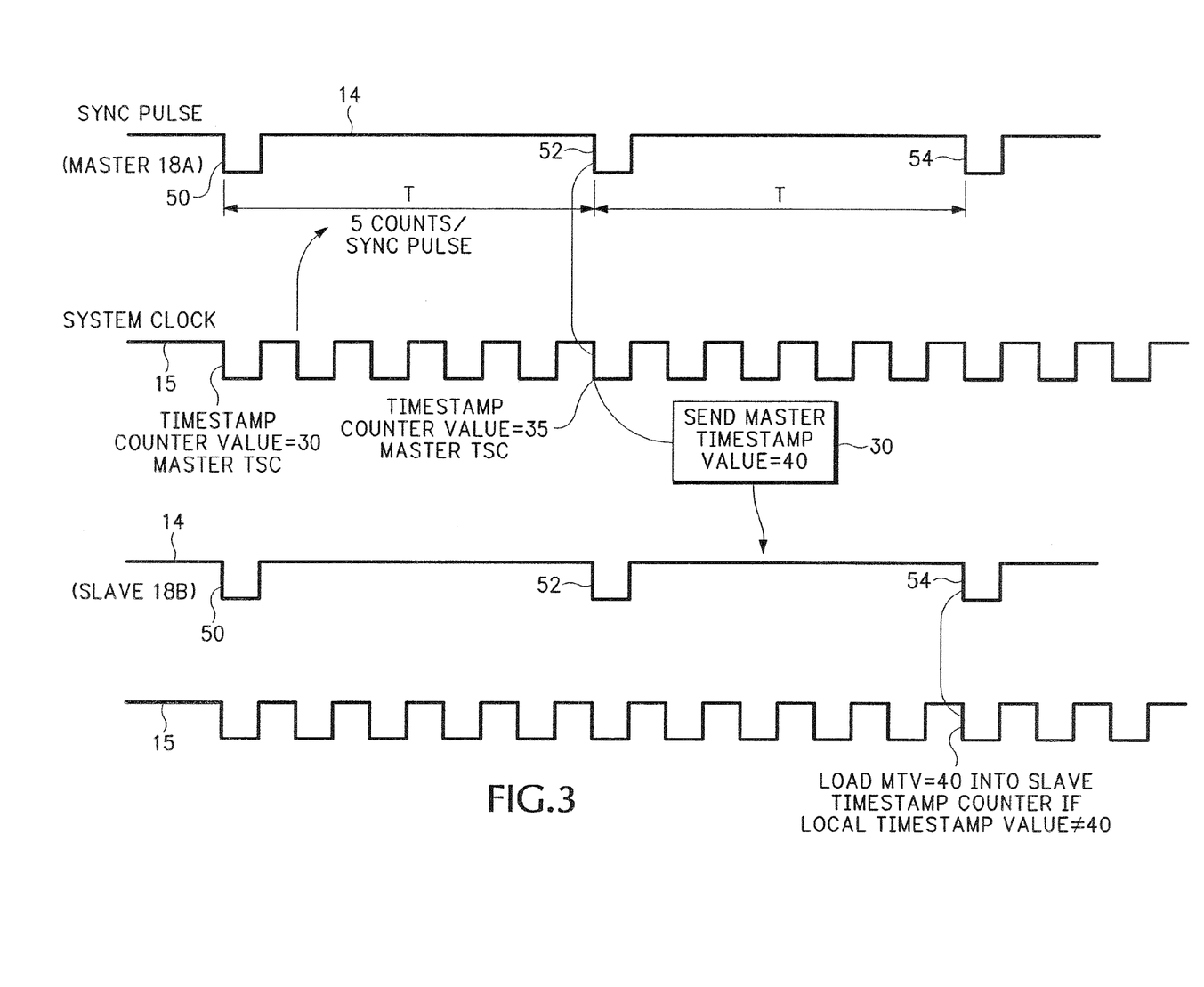
FIG. 3 is a timing diagram showing how the TSCs operate.

FIG. 3 is a timing diagram showing one example of how the slave TSC 18B is synchronized with the master TSC 18A. Referring to FIGS. 2 and 3, the master timestamp counter 44A in the master TSC 18A has a particular timestamp value at pulse 50 of synchronization pulses 14. In this example, the timestamp counter value is thirty. At a next pulse 52, the value of master timestamp counter 44A is thirty five. The processor 40A in master TSC 18A calculates the period T between pulses 50 and 52 to be five counts. The processor 40A predicts that the master timestamp counter 44A will have a value of forty at pulse 54.

After pulse 52, the processor 40A generates the message 30 that identifies the master timestamp value=40. The message 30 is sent via the wide area network 19 to the CMTS that contains slave TSC 18B. The processor 40B receives the message 30 and stores the master timestamp value=40 in holding register 42B. At the next received sync pulse 54, the processor 40B compares the value in holding register 42B with the local timestamp value output by slave timestamp counter 44B.

If the two values match, or come within some predetermined range, the slave timestamp counter 44B continues counting with no reload. If the master timestamp value (MTV) in holding register 42B and the output of slave timestamp counter 44B at pulse 54 do not match, or come within the predefined range, then the salve timestamp counter 44B is loaded with the master timestamp value 40 in holding register 42B.

In another embodiment, the master TSC 18A may predict the master timestamp value for some other pulse, other than the immediately following pulse 54. For example, the master TSC may predict the master timestamp value for two clock pulses after pulse 52. This would allow more time for the master timestamp value to arrive and be processed by the slave TSCs. In another embodiment, the sync pulse used as a reference for comparing to the master timestamp value is marked to distinguish it over other sync pulses.

Figure 4:
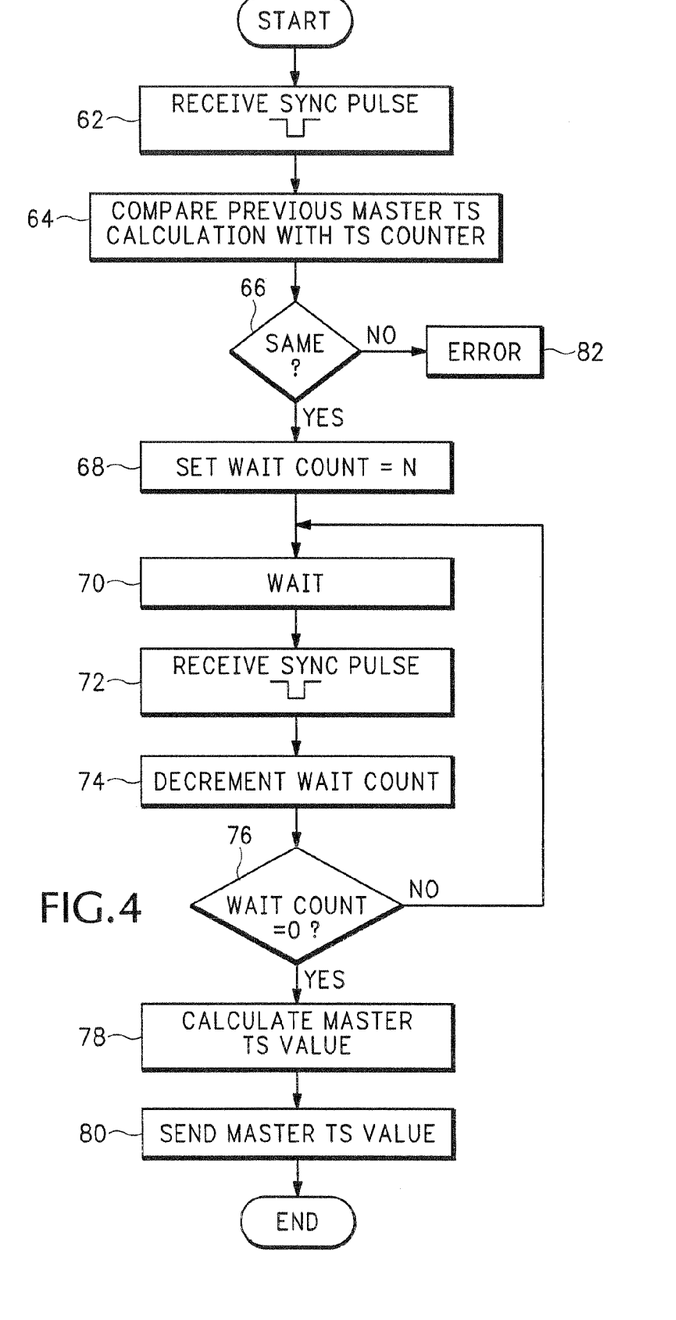
FIG. 4 is a flow diagram showing how a master TSC operates.

FIG. 4 shows the operations performed for the master TSC 18A shown in FIGS. 1 and 2. In block 62, the master TSC receives the sync pulses 14. The previous calculation for the expected master timestamp value at a next sync pulse is compared with the actual value output from the master timestamp counter 44A (FIG. 2). If the two values are not the same in decision block 64, an error routine is executed in block 82. This may include sending an error message to one of the slave synchronization circuits. The circuit receiving the error message could then take over operation as a new master TSC.

If the two values are the same, or within some predetermined range, a wait count is set in block 68. The wait count is set when a master timestamp value is not sent for each sync pulse. This may be done to reduce system data traffic. The master waits in block 70 until another sync pulse is received in block 72 and then decrements the wait count in block 74. The master receives sync pulses until the wait count drops to zero in decision block 76.

The master timestamp value is predicted in block 78. For example, as previously described in FIG. 3, the number of counts that are expected to occur for a period T between adjacent sync pulses is determined. The processor 40A (FIG. 2) then adds the count value of the master timestamp counter 44A (FIG. 2) at the last received sync pulse with the number of counts previously calculated for a period T between adjacent sync pulses. This value is referred to as the master timestamp value. The master TSC in block 80 then sends the master timestamp value in a IP message to the slave TSCs located in other CMTSs.

Figure 5:
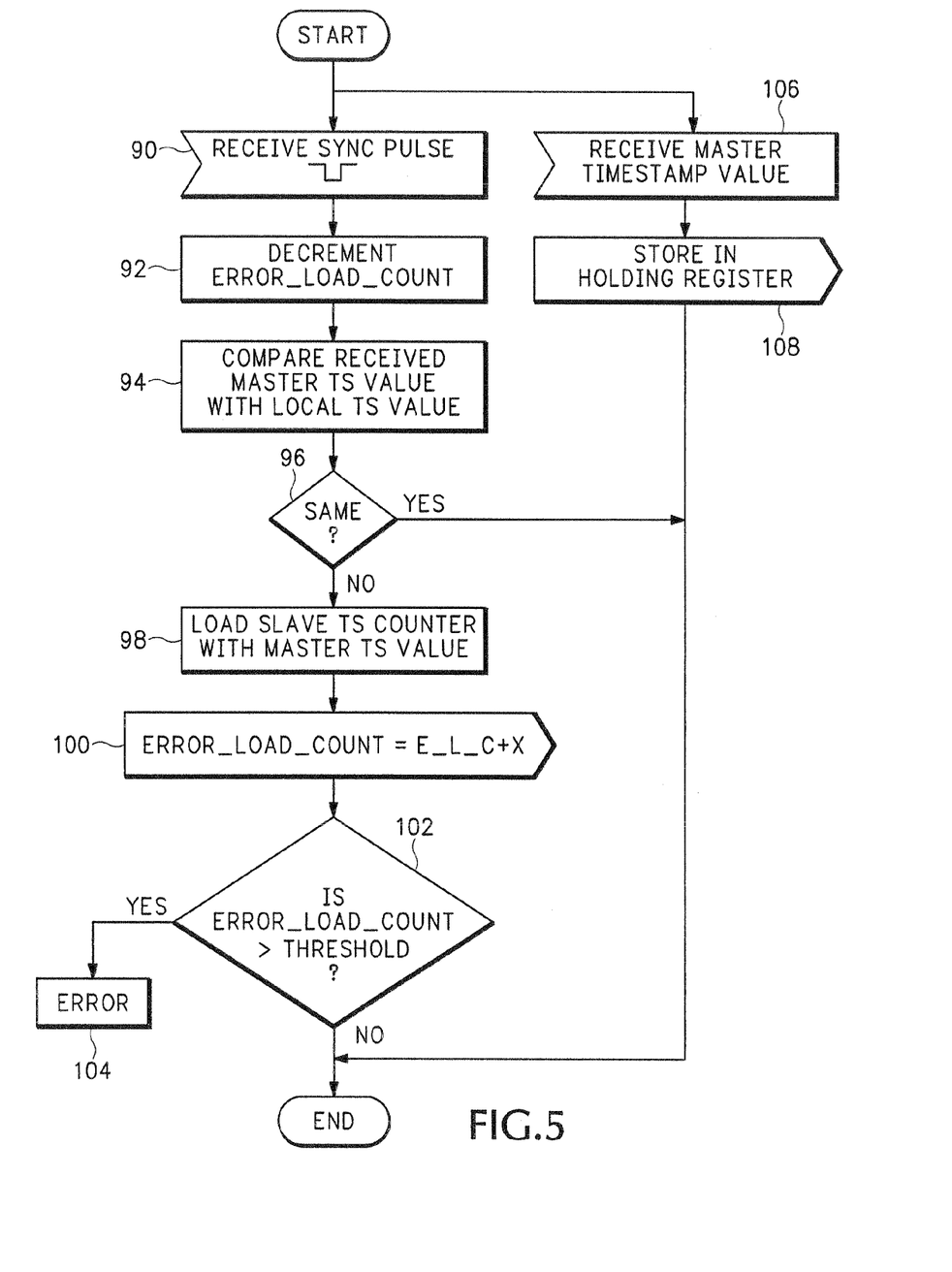
FIG. 5 is a flow diagram showing how a slave TSC operates.

FIG. 5 shows the operations performed by one of the slave TSCs, such as slave TSC 18B or 18N. The slave TSC receives the master timestamp value via an internet connection or some other sort of asychronous data transfer in block 106. The master timestamp value is loaded into a local holding register 42B (FIG. 2) in block 108. The slave TSC receives a next synchronization pulse after receiving the master timestamp value in block 90. An error load count value (Error_Load_Count) is decremented in block 92. In block 94, the master timestamp value previously stored in the local holding register is compared with the local timestamp value generated by the slave timestamp counter 44B (FIG. 2).

If the two values are the same, or within some predefined acceptable range in decision block 96, the slave TSC returns to wait for a next master timestamp value in block 106. If the two timestamp values are not the same, or not within the predefined range, then the slave timestamp counter 44B is loaded with the master timestamp value previously stored in the holding register 42B in block 98.

Blocks 92, 100, 102 and 104 provide an error checking routine. The Error_Load_Count value tracks how many times a slave TSC is reloaded with the master timestamp value for some ratio of received synchronization pulses. For example, every time the slave timestamp counter is reloaded, the Error_

Load_Count is increased by some value "x". The Error_Load_Count is then decremented in block 92 for every synchronization pulse received in block 92. If the Error_Load_Count exceeds some predetermined threshold in decision block 102, an error routine is executed in block 104. The error routine may log an error message, send an error message to a system administrator, or may automatically switch in a redundant line card.

In order to illustrate how the technique of the present invention may be used to overcome some of the limitations associated with conventional cable network configurations, an example of a video-on-demand application will now be described using the access network shown in FIG. 6. The TSCs 18A and 18B for CMTS 16A and 16B, respectively, are included at the head end of the cable network and may include hardware and/or software which is used to synchronize selected line cards within the CMTSs.

The TSCs 18A and 18B update current time reference data, and periodically distribute local clock signals 46A and 46B to each (or a selected portion) of Media Access Control (MAC) 106 and 108, respectively. The TSCs 18A and 18B may alternatively reside inside the MACs 106 and 108, respectively. By synchronizing each of the TSCs as described above, each MAC within each CMTS may be synchronized with other MACs within other CMTSs, thereby resulting in each line card in each CMTS being in synchronization.

Figure 6:
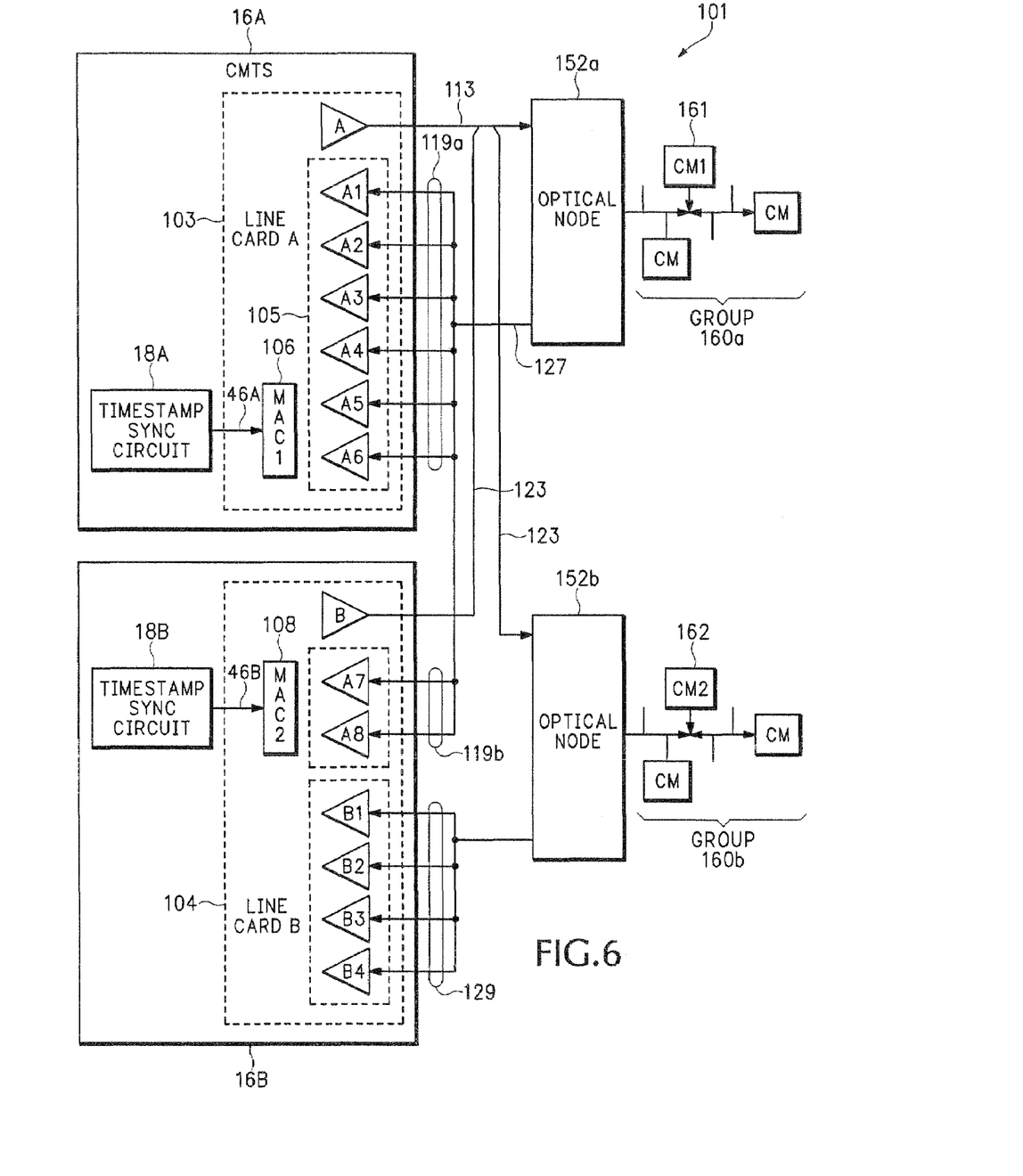
FIG. 6 shows one example of how the synchronization system may operate in the access network.

In FIG. 6, a downstream channel A (113) and downstream channel B (123) are RF combined and connected to a single optical fiber which carries the downstream signals to both optical node 152A and optical node 152B. Thus, each of the cable modems within group 160A and group 160B are able to receive both downstream channel 113 and downstream channel 123.

In this example, it is assumed that each downstream channel A (113) and B (123) is provided sufficient bandwidth for simultaneously broadcasting a plurality of different movies or other video data. Further, it is assumed that a user connected to cable modem CM1 (161) has previously been watching a movie on downstream channel A and communicates with the CMTS 16A via upstream channel A1 of upstream path 127. In this example, the user at CM1 now wishes to watch a movie which will be broadcast on downstream channel B.

At this point, the CMTSs have a number of different options by which to proceed. First, the CMTS 16A may provide the desired movie to CM1 on downstream channel A. However, even assuming that the cable operator has the additional bandwidth to provide this movie on downstream channel A, this option is undesirable as it is considered to be a waste of resources to broadcast the identical movie on two different downstream channels. Alternatively, a preferred solution would be for the CMTS 16A to instruct the cable modem CM1 to switch downstream channels and receive the movie on downstream channel B.

In conventional cable networks, this option would not available since, without synchronization between the two line cards A (103) and B (104), it would not be possible for the cable modem CM1 to "listen" to the CMTS 16B on downstream channel B and "talk" to the CMTS 16A on upstream channel A1. However, using the synchronization technique of the present invention, the cable modem CM1 is able to obtain current timestamp data from downstream channel B associated with line card B in CMTS 16B, and use the timestamp data to synchronize itself with line card A in order to "talk" to the CMTS 16A via upstream channel A1. The TSCs 18A and 18B allow each respective MAC controller 106 and 108 to be in synchronization. Accordingly, cable modem CM1(161) is able to use the timestamp message on downstream channel B (123) to communicate with the upstream receivers 105 on line card A.

Referring to the video-on-demand example described above, when the cable modem CM1 sends a request to the CMTS 16A to view a movie which is currently being broadcast on downstream channel B, the CMTS 16A may respond by instructing the cable modem CM1 to switch its downstream channel from downstream channel A to downstream channel B. The cable modem CM1 is then able to "listen" to the CMTS 16B on downstream channel B, and "talk" to the CMTS 16B using any one of the upstream A channels 119A or 119B.

Cable modems in group 160B can receive data from downstream channel A or downstream channel B. Cable modems in group 160B send data over upstream channels 129. A modification may be made whereby the upstream and downstream ports on each line card are connected to both optical node 152A and optical node 152B. In this modified embodiment, each of the cable modems in the network has access to the ports on both line card A and line card B.

Initially, it may be assumed that line card A in CMTS 16A services the cable modems of group 160A, and line card B in CMTS 16B services the cable modems of group 160B. In accordance with the technique of the present invention, if a problem occurs on line card A, for example, the group 160A modems are able to switch over to line card B in CMTS 16B without these modems having to resynchronize themselves with the line card B time reference (since line card A is already synchronized with line card B).

In conventional systems, the two line cards in separate CMTSs would not be synchronized. Thus, any modems switching from line card A to line card B are required to re-synchronize with line card B. This introduces delays in the communication protocol between the cable modem and the CMTS. In certain applications, such as telephony, such delays are extremely undesirable since they directly effect the call quality of a voice call.

Thus, the technique of the present invention may be used to synchronize a plurality of different access controllers which control a plurality of distinct ports at the Head End of an access network. In the context of a cable network, the technique of the present invention may be used to synchronize desired upstream and/or downstream channels across different line cards within different Cable Modem Termination Systems (CMTS).

The synchronization scheme described in Ser. No. 09/490,761 filed Jan. 24, 2000, can be used for distributing a synchronized local timestamp for a particular CMTS to different line cards connected together on the same CMTS backplane.

The synchronization techniques described above offer a number of distinct advantages over conventional techniques used in the configuration or design of access networks. For example, there are a limited number of line cards slots in each CMTS chassis. In current CMTS architectures, both upstream and downstream line cards must be located in the same chassis. That means one upstream and one downstream redundant line card is required for each chassis (3+1 and 3+1).

The present invention allows downstream line cards to be located in the same chassis and upstream line cards to be located in the same chassis. Then only one redundant line card is required for each chassis. For example, if a chassis was limited to eight line card slots, then seven slots could be used for downstream line cards, and only one slot would be required for a redundant downstream line card (7+1). Another CMTS is used for seven upstream line cards and one redundant upstream line card (7+1). Thus, the synchronization scheme described above saves one line card slot for each eight slot chassis.

In addition to providing benefits for redundancy protocols, the timestamp synchronization technique of the present invention provides for seamless downstream channel change at the cable modem end. Timestamp synchronization also provides benefits in facilitating multi-service convergence of voice, video, and high-speed data applications. These issues become increasingly important as streaming media and video streams are multiplexed onto the same data network.

Additionally, the technique of the present invention provides added flexibility in network implementation by allowing DOCSIS (or MAC) domains to be dynamically configurable via software. Further, each DOCSIS domain may be configured to cross line card and CMTS boundaries. Thus, the technique of the present invention provides the advantage of allowing different upstream and/or downstream ports on different line cards to be grouped together within the same DOCSIS domain.

This provides the advantage of allowing greater flexibility in the design of line card interfaces. Furthermore, since different ports on different line card interfaces may be assigned to the same domain, the cable operator or service provider is allowed greater flexibility and scalability in configuring different domains to suit the needs specific applications such as, for example, telephony, video-on-demand, etc.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A synchronization circuit, comprising:
a local timestamp counter configured to generate a local timestamp value;
a processing circuit to receive externally generated synchronization pulses and to receive a predicted master time stamp value associated with a future one of the externally generated synchronization pulses, wherein the processing circuit receives the predicted master timestamp value asynchronously in Internet Protocol (IP) packets received over an IP connection,
the processing circuit to identify the local timestamp value and synchronize the local timestamp value upon receipt of the future one of the externally generated synchronization pulses; and
one or more line cards in a same Cable Modem Termination System (CMTS) chassis that each have local timestamp counters that is adjusted according to the received predicted master timestamp value and local timestamp value at the future received synchronization pulse and wherein the processing circuit identifies an error condition according to a number of times the local timestamp counter is synchronized with the received predicted master timestamp value.

2. The synchronization circuit according to claim 1 wherein the processing circuit is located in a Cable Modem Termination System (CMTS) and receives the predicted master timestamp value from another CMTS.

3. The synchronization circuit according to claim 1 wherein the Internet Protocol (IP) packets containing the master timestamp value use a multicast address.

4. The synchronization circuit according to claim 1 including a holding register configured to store the received master timestamp value.

5. The synchronization circuit according to claim 2 further comprising the processing circuitry to forward the predicted master timestamp value to the another CMTS.

6. The synchronization circuit according to claim 1 wherein the synchronization pulse cycle at a rate of somewhere between 8 Kilo Hertz and 1 Hertz.

7. The synchronization circuit according to claim 1 including a first CMTS including one or more line cards that are used for downstream channels and a second CMTS including one or more line cards that are used for upstream channels, cable modems receiving data on the downstream channels of the first CMTS and sending data on the upstream channels of the second CMTS.

8. A synchronization system, comprising:
a first Cable Modem Termination Systems (CMTS) having a first chassis containing a master synchronization circuit;
a second CMTS having a second separate chassis containing a slave synchronization circuit;
a master synchronization circuit including:
a master counter to generate respective master timestamp values varying with cycling of a clocking signal;
a processing circuit to determine, for a given count of consecutive ones of synchronization pulses cycling less often than the clocking signal, the corresponding difference between the master timestamp values and to
calculate a future master timestamp value by adding the corresponding difference to an initial one of the master timestamp values corresponding to an initial one of the synchronizing pulses and the master synchronization circuit being configured to
forward the calculated future master timestamp value to the slave synchronization circuit over a wide area network for synchronizing the value of a slave counter in the slave synchronization circuit with the future master timestamp value at a future synchronization pulse generated independently of operations by the master counter and slave counter and corresponding to a given count of consecutive ones of synchronization pulses following the initial one of the synchronization pulses; and
one or more line cards in at least one of the first and second CMTS that include one or more slave circuits each synchronized with the future master timestamp value at the future synchronization pulse when the difference between an actual master timestamp value and the future master timestamp value is within the predetermined range.

9. The system according to claim 8 wherein the master synchronization circuit is further configured to:
identify the actual master timestamp value corresponding to the future synchronization pulse when the future synchronization pulse occurs;

determine whether a difference between the actual master timestamp value and the future master timestamp value is within a predetermined range; and send an error message to one of the slave synchronization circuit when the difference between the actual master timestamp value and the future master timestamp value is not within a predetermined range that causes the slave synchronization circuit to take over operations as the master synchronization circuit.

10. The system according to claim 9 wherein the slave synchronization circuit is configured to calculate and forward new future master timestamp value in response to receiving the error message.

11. The system according to claim 8 wherein the slave synchronization circuits adjust a received future master timestamp value according to an amount of delay associated with receiving the synchronization pulses.

12. A method for synchronizing circuitry, comprising:

identifying a period between synchronization pulses;

extrapolating a time for a future synchronization pulse by adding one of the synchronization pulses to the period multiplied by a predetermined amount, extrapolating a master timestamp value by adding a master timestamp value for the one of the synchronization pulses and the predetermined amount multiplied by a difference between two previous master timestamp values, receiving the extrapolated master timestamp value for an upcoming time reference in an Internet Protocol (IP) packet over an asynchronous Internet connection;

generating a local timestamp value;

comparing the local timestamp value at the upcoming time reference with the extrapolated master timestamp value;

synchronizing the local timestamp value with the extrapolated master timestamp value according to the comparison; and receiving the extrapolated master timestamp value from a first cable modem termination system (CMTS) and using the extrapolated master timestamp value to synchronize a timing circuit in a second CMTS.

13. A method according to claim 12 including:

synchronizing the timing circuitry in the first Cable Modem Termination System (CMTS) with the timing circuitry in the second CMTS;

using the first CMTS to send data to cable modems; and using the second CMTS to receive data from the same cable modems.

14. A method according to claim 12 further including:

receiving an error message indicating that the extrapolated master timestamp value is not equal to an actual master timestamp value for a next synchronization pulse;

predicting a new master timestamp value in response to the error message; and sending the predicted new master timestamp value to a generation source of a message including the received extrapolated master timestamp value.

15. The synchronization circuit of claim 1 wherein the predicted master timestamp value is equal to a sum of an actual master timestamp value for a previous synchronization pulse and a predetermined amount multiplied by a difference between two previous actual master timestamp values.

16. The synchronization circuit of claim 15 wherein the predetermined amount is equal to a quotient of a difference in the time between the previous synchronization pulse and a next synchronization pulse divided by a period between synchronization pulses that corresponds to the two previous actual master timestamp values.

* * * * *

UNITED STATES PATENT AND TRADEMARK OFFICE
CERTIFICATE OF CORRECTION

| | | |
|---|---|---|
| PATENT NO. | : 7,394,830 B2 | Page 1 of 1 |
| APPLICATION NO. | : 10/662025 | |
| DATED | : July 1, 2008 | |
| INVENTOR(S) | : Chapman | |

It is certified that error appears in the above-identified patent and that said Letters Patent is hereby corrected as shown below:

At Title Page, Item (75), please replace "Cupertino" with --Saratoga--.
At Title Page, Item (74), please replace "Cowger" with --Cowger LLP--.
At column 2, line 50, please replace "occurrance" with --occurrence--.
At column 4, line 47, please replace "asychronous" with --asynchronous--.
At column 7, line 55, please replace "time stamp" with --timestamp--.
At column 8, line 14, claim 4 please replace "received" with --received predicted--.
At column 8, line 20, claim 6 please replace "pulse" with --pulses--.
At column 9, line 13, claim 10 please replace "value" with --values--.
At column 10, line 31, claim 16 please replace "the time" with --time--.

Signed and Sealed this

Twenty-eighth Day of April, 2009

JOHN DOLL
*Acting Director of the United States Patent and Trademark Office*